ARTICLE LABELING AND IDENTIFICATION SYSTEM

Original Filed June 27, 1968 2 Sheets-Sheet 1

INVENTOR
JOSEPH F. SCHANNE

BY John T. O'Halloran
ATTORNEY

ARTICLE LABELING AND IDENTIFICATION SYSTEM

Original Filed June 27, 1968 2 Sheets-Sheet 2

INVENTOR
JOSEPH F. SCHANNE

BY John T. O'Halloran
ATTORNEY

United States Patent Office

Re. 28,285
Reissued Dec. 31, 1974

28,285

ARTICLE LABELING AND IDENTIFICATION SYSTEM

Joseph F. Schanne, Cheltenham, Pa., assignor to RCA Corporation

Original No. 3,622,758, dated Nov. 23, 1971, Ser. No. 88,075, Nov. 9, 1970, which is a continuation of abandoned application Ser. No. 740,624, June 27, 1968. Application for reissue Nov. 20, 1973, Ser. No. 417,562
Int. Cl. G06k *5/00*
U.S. Cl. 235—61.11 E 14 Claims

Matter enclosed in heavy brackets [ ] appears in the original patent but forms no part of this reissue specification; matter printed in italics indicates the additions made by reissue.

ABSTRACT OF THE DISCLOSURE

Binary coded designator labels are affixed to articles to identify them. The articles are optically scanned to detect the binary codes on the labels and the binary codes are decoded to provide automatic reading and recognition of the articles. Circuits are included for discriminating against signals produced in response to dirt or defects in the optically scanned surface.

This is a continuation of Application Ser. No. 740,624, filed June 27, 1968, and now abandoned.

BACKGROUND OF THE INVENTION

Systems have been disclosed heretofore that are designed to automate checkout counters in supermarkets, department stores, etc. One such system utilizes binary coded labels that are affixed to articles to designate the prices of the articles. The articles, and hence the coded labels, are optically scanned by a scanning light to provide coded light signals that are decoded to provide the prices of the articles. The total purchase price is therefore automatically obtained by the system without the necessity of having checkout clerks read the prices of many articles and record them in a cash register. However, in some of such systems, no identification of the articles is provided and hence there is no inventory control.

To identify an article in a modern department store, supermarket, etc. it is necessary that a coded label be packed very densely with information data so as to be able to designate any one of the tens of thousands of articles that may be stocked in such stores. When a large amount of identifying information data is contained in a relatively small label, it is necessary that the label design be carefully selected and also that a suitable coding be selected so that the label can store all the necessary data and still provide a reliable readback signal when optically scanned. The alternative to such high density packing problems is making the labels large. However, this would preclude the labeling of many small articles.

Another problem that exists in optically scanning the labels is that the size and shape of the articles vary appreciably from each other. Such variations occur even at the bottoms and/or tops of the articles where labels are typically affixed to be scanned. For example, canned goods, glassware, and etc., exhibit concave bottoms that vary from article to article. Thus, the depth of focusing of such an optical-scanning system must be large. This poses the problem of avoiding the refocusing of the optical scanning system for different articles in order to prevent the scaning light from spreading so much as to overlap adjacent binary data in densely packed labels.

OBJECT

Accordingly, it is an object of this invention to provide an artcile identification system wherein article labels are designed to be densely packed with identifying information data and then optically scanned to provide a reliable readback signal without the necessity of refocusing the scaning system for different articles, and without the obfuscation of adjacent information data in the readback signal.

SUMMARY OF THE INVENTION

An article identification system embodying the invention utilizes designator labels that are affixed to articles that are to be automatically identified. The designator labels include a plurality of information cells exhibiting first and second properties, such as first and second light reflectances. The first and second reflectances exhibit transitions therebetween, the occurrence of which define binary numbers. A scanner is positioned to scan each article label to produce a readback signal exhibiting two distinct amplitudes corresponding to said first and second reflectances. A slope detector is coupled to detect the transitions between said two distinct amplitudes in said readback signal so as to provide binary numbers corresponding to the occurrence of said reflectance transitions on said label.

In accordance with one aspect of the invention, the designator labels that are provided may be packed very densely and optically scanned without missing any of the information data. This is accomplished by providing a label having a plurality of information cells, e.g., bit cells, each of which includes a pair of concentric annular rings that exhibit two different light reflectance characteristics. The annular rings, may for example, comprise black and white annular rings that are juxtaposed concentrically with respect to each other and paired in couplets, i.e., information cells, such that a transition from a black ring to a white ring represents one binary number, i.e. "0," and a transition from a white ring to a black ring represents the other binary number, i.e. "1." Such transitions in reflectance produce transitions in amplitude from a first level to a second level in a readback signal derived from scanning such labels. When the designator labels are scanned, transitions in amplitude always occur in the readback signal for each binary digit (bit) recorded on the label and this is true even at high packing densities.

In accordance with another aspect of the invention, a transition or slope detector is provided that detects the positive and negative slopes in a readback signal to provide output signals that correspond to the binary digits corresponding to said transitions.

BRIEF DESCRIPTION OF THE DRAWINGS

FIGS. 4a and 4b, is a set of waveforms showing the manner in which the positive and negative going transitions are extracted from the readback signal derived when scanning the label of FIG. 2.

DETAILED DESCRIPTION

Figure 1:
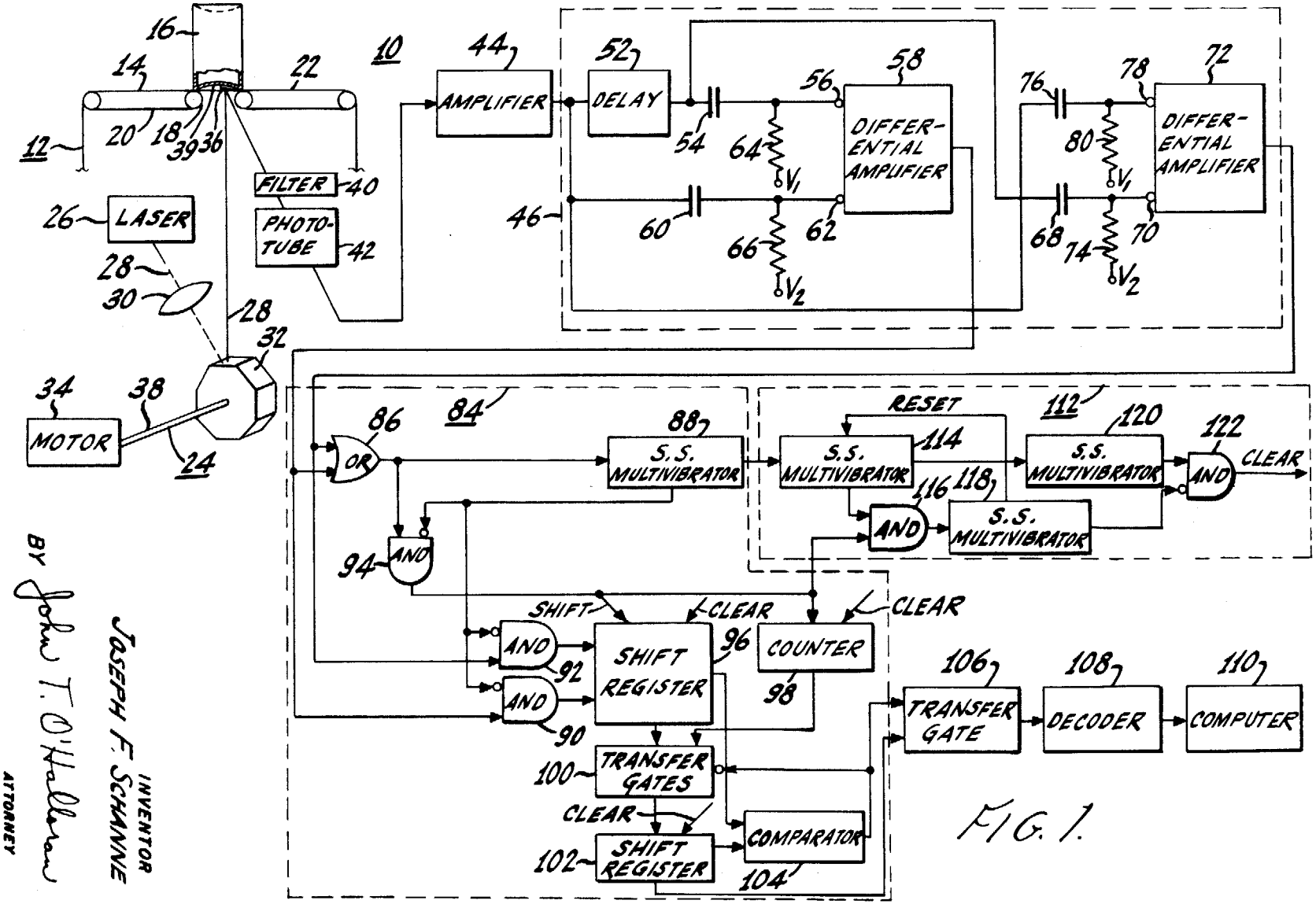
FIG. 1 is a schematic circuit diagram of an article identification system embodying the invention.

Referring now to FIG. 1, an article identification system 10 embodying the invention includes an article handling station which may, for example, include a checkout counter 12 having a movable counter top 14 for transporting articles 16 over a scanning aperture or slit 18 in the counter top 14. The counter top 14 may, for example, include a pair of conveyor belts 20 and 22 that are adjacent to and form the slit 18. The belts 20 and 22 convey the articles over and past the slit 18. The slit 18 may, for example, be on the order of 1 inch in width and 6 inches deep. The 6 inch depth goes into the drawing in FIG. 1. The remaining portions of the counter top 14 and the side rails thereof are not shown in FIG. 1 for simplicity. The slit 18 is dimensioned to insure that an article 16 may be scanned by an optical reading station positioned below the counter top 14.

The reading station 24 includes a laser beam source 26, which produces a laser beam 28 that is focused by a focusing lens 30 into a very fine scanning spot onto a multi-faced mirror 32. The laser beam source 26 may, for example, comprise a helium-neon laser that is pumped to produce a continuous laser beam of red monochromatic light of approximately 6,328 Angstrom wavelength. The mirror 32 is mounted to be rotated at a substantially constant speed by a motor 34 about a central axis 38 and is positioned to intercept the laser beam 28 and project this scanning meam 28 into the slit 18 in the counter top 14. The rotatable mirror 32 is positioned offset from the slit 18 so that dirt, etc. falling through the slit 18 does not strike the mirror 32. The rotation of the mirror 32 causes a succession of laser beam scans of the slit 18, each scan being in a direction generally transverse to the direction of movement of the article 16. The number and sizes of the faces of the mirror 32 are selected to produce only one scaning spot on the underside of the article 16 at any one time.

Figure 2:
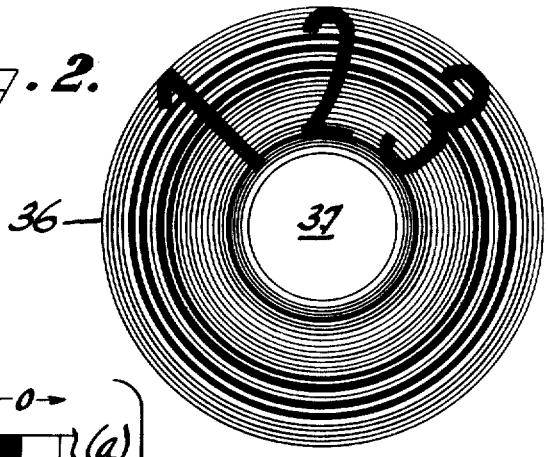
FIG. 2 is a pictorial representation of a typical designator label utilized in the identification system of FIG. 1.

Each article 16 has affixed to the underside or bottom thereof a coded designator 36. The coded designator 36, may for example, comprise a tag such as a metal tag affixed to the article 16 or a label glued onto the article 16 by an adhesive 39. The designator 36 may even be stamped onto the article 16. However, the designator 36 will be described as a coded paper label in this specification. As shown in FIG. 2, one type of designator 36 includes a plurality of concentric ranges of first and second light reflecting characteristics. The first light-reflecting characteristic is provided by white annular rings or circles whereas the second light-reflecting characteristic is provided by dark or black concentric rings. The black and white concentric ranges are paired together in couplets to comprise information cells that represent binary numbers. Thus, an outer white concentric ring in conjunction with an adjacent inner black concentric ring is an information cell or bit cell that includes a white-to-black transition in reflectance and such a transition is selected to represent a binary "1." Alternatively, an outer black concentric ring in conjunction with an adjacent inner white ring is a bit cell that includes a black-to-white transition in reflectance and such a transition is selected to represent a binary "0." Of course, other colors could also be utilized. By providing a relatively large number of couplets, e.g., on the order of thirty, in the designator 36, the number of binary bits available is sufficient to identify all of the different types of articles sold in modern stores.

The pairing of black and white concentric rings into couplets and juxtaposing the couplets in accordance with the binary code selected causes a significant transition in reflectance to occur at the center of each bit cell. Such a transition in reflectance produces a transition in amplitude in a readback signal obtained by scanning a designator 36. Thus, even at high packing densities, a transition in amplitude occurs for each binary bit recorded on the designator 36 and the significant information may be extracted from the readback signal. This permits a relatively small designator label e.g., 1 inch in diameter, to be utilized in identifying the articles. A round designator 36 is convenient because it permits the label to be scanned in any direction and still obtain the same information. Arabic numerals may also be printed on the designator 36 so that clerks may visually identify the designator labels 36. The numerals may be printed in a color to which the scanner is insensitive. For the laser 28, the color selected is red.

It is to be noted from the designator 36 that although a significant transition in reflectance occurs in the center of every information cell, there also occurs an extraneous transition at the boundary of some information cells. When the same binary number occurs in two successive cells, then an extraneous transition occurs between these two cells. This is because the reflectance changes must be repeated in order to record the second identical binary number and such a return causes an extraneous transition. The elimination of such extraneous transitions from the readback signal and the extraction of the significant transitions from the readback signal will be described subsequently. A laser 26 is particularly effective as the scanner for the designator 36 because the coherent light emitted by a laser beam can be focused into a very small scanning spot but still exhibit a high radiance or intensity of light. Consequently, a laser beam signal reflected from the designator 36 still exhibits sufficient light to be readily extractable from the ambient light. The small scanning spot, of course, permits small or narrow information bit cells on the order of 10 milli-inches to be utilized on the designator. Such small bit cells, of course, permit information to be packed densely on the designator 36.

The reading station 24 also includes an optical filter 40 and a photoresponsive pickup device such as photomultiplier tube 42 that are positioned in series with each other and offset from the slit 18 to detect diffuse light reflected from the article 16 and designator 36. Diffuse light rather than specular light is picked up because specular reflection tends to make the designator 36 unreadable. The optical filter 40 is matched to the monochromatic light exhibited by the laser beam 28 and filters out ambient light having wavelengths not within the passband of the filter 40. Thus, little extraneous light impinges on the phototube 42 even though such an article handling station may contain high light levels to permit the clerks to function at their highest efficiency. If such high white levels were allowed to impinge upon the phototube 42, then the readback signal from the designator 36 might be masked by the greater light and so become unreadable. The phototube 42 converts the diffuse light in the readback signal derived from scanning the article 16 into an electronic signal. The phototube 42 is coupled to an amplifier 44 to amplify the electronic readback signal.

The amplifier 44 is coupled to a slope or transition detector 46. The slope detector 46 detects the positive going and the negative going transitions in the readback signal. Such a readback signal may, for example, be similar to the readback signal 48 in line o of FIG. 3. It is to be noted that the readback signal 48 exhibits two different periods $T_1$ and $I_2$. The portions of the readback signal 48 that exhibit the period $T_1$ are those wherein adjacent numbers in the binary code are the same, i.e., either a series of "1" or "0" whereas the portions of the signal 48 that exhibit the period $T_2$ are those wherin two adjacent numbers in the binary code change from "1" to "0" and "0" to "1". Each portion of the readback signal varies between two levels of amplitude $L_1$ and $L_2$. The level $L_2$ is essentially the black level of the signal whereas the level $L_1$ is the peak amplitude or white level of the signal. The transitions in amplitude between these two levels carries the coded data in the readback signal. However, it is to be noted that an extraneous transition occurs at the boundary of a bit cell wherein the next adjacent binary number is the same as the preceding one. Such an extraneous transition is illustrated by the transition 50 in line c of FIG. 3. The transition 50 corresponds to the transition at the boundary between the first two-bit cells in the designator 36 that store the binary number 110100 shown in lines a and b of FIG. 3.

The slope detector 46 detects the negative going and positive going transitions in the waveform 48, whether or not the transitions are significant ones or extraneous ones. The slope detector includes a delay circuit or line 52 that is coupled to delay the waveform 48 for substantially one quarter of the time interval of the period $T_1$, which is $T_{1/4}$. The reason for this delay will be explained in the description of the operation of the system 10. The delayed waveform is coupled through a coupling capacitor 54 to a first terminal 56 of a difference amplifier 58. The undelayed waveform is coupled through a coupling capacitor 60 to the other terminal 62 of the difference amplifier 58. The input terminal 56 is biased by a voltage applied through a resistor 64 from a high bias voltage source $V_1$. The input terminal 62 is biased by a low bias voltage derived from a low-voltage source $V_2$ and applied to the terminal 62 of the difference amplifier 58 through a resistor 66. The difference amplifier 58 produces an output signal only when the input signal applied to the input terminal 62 is greater than or more positive than the input signal applied to the terminal 56. As will be described in more detail subsequently, this occurs only when a positive going transition occurs in the undelayed readback signal. Consequently, the difference amplifier 58 produces an output signal for every positive going transition in the readback signal.

The delayed readback signal is also applied through a coupling capacitor 68 to the second input terminal 70 of a second difference amplifier 72. The second difference amplifier 72 detects negative going transitions in the readback signal. Terminal 70 is biased by a low biasing voltage derived from the low-voltage power supply biasing source $V_2$ and applied through a resistor 74. The undelayed readback signal is also coupled through a coupling capacitor 76 to the first input terminal 78 of the difference amplifier 72. This terminal 78 is biased by a high biasing voltage derived from the high voltage source $V_1$. The bias voltage $V_1$ s applied through a resistor 80 to the terminal 78 of the amplifier 72. The difference amplifier 72 produces an output signal only when the signal applied to the second input terminal 70 is greater in amplitude than or more positive than the signal applied to the terminal 78. This occurs only when the delayed signal exhibits a negative going slope, as will be explained more fully subsequently. Consequently, the second difference amplifier 72 detects negative going transitions in the readback signal.

The difference amplifiers 58 and 72 detect all the positive and negative going transitions in the readback signal 48 regardless of whether or not the transitions are significant transitions or extraneous transitions. A valid or significant transition pulse separation circuit 84 is coupled to the slope detector 46 to extract and then store only the valid transitions in the readback signal 48. The output from each difference amplifier 58 and 72 is coupled to an OR-gate 86 and then applied to a single-shot multivibrator 88. The single-shot multivibrator 88 produces an output pulse when triggered by each detected transition and consequently effectively extracts the inherent timing contained in the transitions in the readback signal. The multivibrator 88 produces a pulse that exhibits a width of $0.75T_1$. This pulse width is selected to suppress the extraneous transitions detected in the readback signal.

The output pulses from the difference amplifiers 58 and 72 are also applied to one input terminal of a corresponding one a pair of AND-gates 90 and 92. The other input terminal of each of the gates 90 and 92 is an inhibit terminal which is denoted by a small circle on the logic gate. The output of the multivibrator 88 is applied to each inhibit terminal to prevent the activation of the gates 90 and 92 by a transition pulse during the time that the multivibrator 88 is producing an output pulse. The effect of this is to effectively suppress extraneous transition pulses, as will be described more fully subsequently. All of the positive and negative going transition pulses, coupled through the OR-gate 86, are applied to one input of AND-gate 94. The other input to the gate 94 is an inhibit input and is derived from the multivibrator 88. The AND-gate 94 provides the clock pulses to shift the data from the gates 90 and 92 into a first storage shift register 96. The output of the gate 94 is also coupled to advance a counter 98.

The counter 98 counts all of the valid transition pulses so as to determine when the end of the significant binary data has been reached. The extraneous transition pulses are blocked by the AND-gate 94. The counter 98 is coupled to a plurality of transfer gates 100, one for each flip-flop stage in the shift register 96, to jam transfer the binary data stored in the first storage shift register 96 to a second storage shift register 102. However, the transfer gates 100 jam transfer the binary complements of the binary numbers themselves. Additionally, the transfer is made in inverse order, that is, by transferring the complement of the binary number in the first stage of the first shift register 96 into the last stage of the second shift register 102, etc. This is because the designator 36 contains annular rings and a scan from the outer periphery to the center of the designator 36 derives data that is both in reverse order and is the binary complement of the data this is derived from the continuation of the scan from the center to the outer periphery of the designator 36. A comparator 104 is coupled to both the storage registers 96 and 102 to indicate when a match exists therebetween. When such a match occurs, transfer gates 106 are activated by the comparator 104 to couple the stored binary data in the shift register 102 to a decoder 108. The decoder 108 decodes the binary data and signals a computer 110 as to the identity of the article 16 scanned. The computer 110 supplies the price of the article 16 that is scanned and stores this price with the other prices of other articles and supplies a total at the end of the entire purchase. The computer 110 also provides inventory control by signifying the decrease in each type of article purchased.

Also provided in the system 10 is a pulse validation circuit 112. The pulse validation circuit 112 produces a general clear pulse to clear out the storage shift registers 96 and 102 and reset the counter 98 when noise pulses occur and also when pulses are derived from scanning the designator 36 at places where the scans do not cross the center spot 37 of the designator 36. The circuit 112 includes a single-shot multivibrator 114 that is coupled to the multivibrator 88 to be activated by the trailing edge of each output pulse produced by the multivibrator 88. The multivibrator 114 produces an output pulse having a duration that is $0.75T_1$, the same duration as the pulses produced by the multivibrator 88. The valid pulses from the AND-gate 94 are also applied through an AND-gate 116 to another single-shot multivibrator 118 when the multivibrator 114 is active. The single-shot multivibrator 118 when activated produces an output pulse that has a duration of $0.3T_1$. This output pulse is coupled to reset the single-shot multivibrator 114. The trailing edge of the output pulse of the single-shot multivibrator 114 is coupled to activate another single-shot multivibrator 120 to produce a clear pulse. The clear pulse is coupled to one input of an output AND-gate 122. The other input to the AND-gate 122 is an inhibit input and is derived from the multivibrator 118. Thus, if a speck of dirt produces a pulse that is coupled through the system 10, the multivibrator 114 will fire and also fire the multivibrator 120 to produce a clear pulse. The clear pulse is coupled through the AND-gate 122 because it is assumed no subsequent dirt specks occur in the time period from $0.75T_1$ to $1.5T_1$. Hence the multivibrator 118 is not activated to inhibit the gate 122 A more detailed description of the circuit 112 is contained in the operation portion of this specification.

OPERATION

Figure 3:
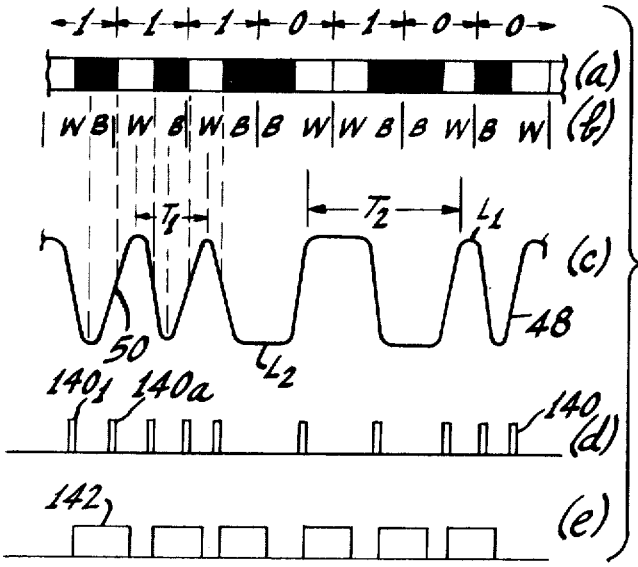
FIG. 3 is a graph illustrating a series of waveforms that appear at various points in the system of FIG. 1.

In describing the operation of the article identification system 10 of FIG. 1, it will be assumed that the information bit sequence shown in line a of FIG. 3 comprises the initial portion of the designator 36 that is being read. Each bit cell effectively comprises a white box and a black box, referenced "W" and "B," respectively, in line b. Signals corresponding to the black and white in such boxes are effectively produced when a scanning beam traverses a diameter of the designator 36 or intercepts the center portion 37 of the designator 36. The binary numbers represented by such couplets are shown above in line a of FIG.

3. The designator 36 being read is attached to the bottom of an article 16. The article 16 bottom may exhibit considerable concavity, but the laser beam from the source 26 is still focused into a fine spot due to the large depth of focusing power exhibited by the laser beam source 26. No refocusing is necessary even if the next article 16 to be scanned exhibits a flat, rather than concave bottom. The article 16 is transported by the conveyor belts 20 and 22 past the scanning slit 18. The scanning beam 28 is focused onto the rotating multifaced mirror 32 to project a plurality of successive scanlines through the slit 18 and onto the article 16 bottom.

For simplicity, it is first assumed that the scanning spot is traversing a diameter in the center of the designator 36. The round designator 36 avoids problems in alignment because the designator can be scanned from any direction. The light from the scanning beam 28 impinges on the designator 36. A pickup photomultiplier 42 is positioned to pickup the diffuse light reflected from the designator 36. An optical filter 40, substantially matched in frequency to the frequency of the laser beam 28, is positioned immediately preceding the photomultiplier 42 so that it filters out all the ambient light other than the monochromatic light that appears within its passband. The diffuse light reflected from the designator 36 and passed through the filter 40 is converted in the photomultiplier 42 into the electronic readback signal 48, shown in line c of FIG. 3. The readback signal 48 exhibits transitions from a low magnitude to a high magnitude and vice versa to correspond to the transitions in reflectance in the designator 36. The signal 48 contains both significant and extraneous transitions.

The signal 48 is applied to transition detector 46 after first being amplified by an electronic amplifier 44. The transition detector 46 detects all the transitions in the readback signal 48 regardless as to whether or not they are significant or extraneous. It is to be noted that a simple threshold detector cannot be utilized instead of the transition detector 46 because ambient light changes would render any threshold selected unreliable. Furthermore, the use of a simple differentiator circuit to detect positive and negative going transitions in the readback signal 48 is not feasible when the scanning spot size approaches the width of an annular ring on the designator 36. In such a case, the readback signal 48 comes close to being a sine wave and consequently a differentiator would not detect the information data reliably.

In the system 10 of FIG. 1, the readback signal 48 is reliably read. The readback signal 48 is first delayed in a delay line 52 and both delayed and undelayed signals are then applied to both the first and second differential amplifiers 58 and 72, although to opposite terminals thereof. The first differential amplifier 58 detects positive going transitions whereas the second differential amplifier detects negative going transitions. This may be seen by referring to FIGS. 4a and 4b.

Figure 4:
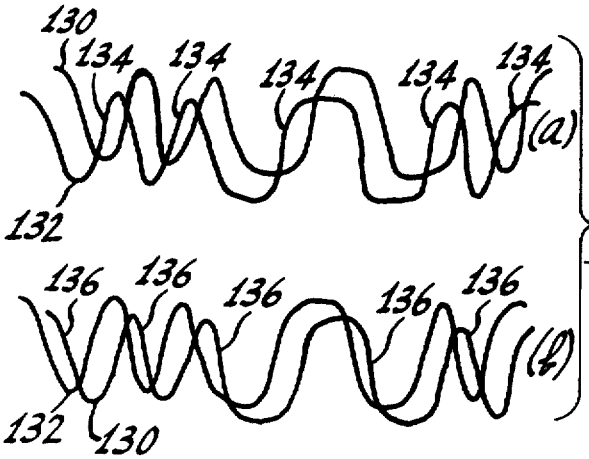
FIG. 4, comprising

Referring to FIG. 4a, the delayed readback signal 130 which because of the source $V_1$ exhibits a greater amplitude than the undelayed readback signal 132, is shown superimposed on the undelayed signal 132. The bias is selected to make the signal 130 greater than the signal 132 by about one-quarter of the peak to peak amplitude of the readback signal 48. The reason for the superimposition shown in FIG. 4a is that the delayed signal 130 is subtracted from the undelayed readback signal 132 in the first differential amplifier 58. Since the differential amplifier 58 cannot physically produce a negative output, the only time that it does produce an output is when the undelayed readback signal 132 is greater, i.e., more positive, than the delayed signal 130. This occurs only at the positive going transitions 134 in the undelayed readback signal. Consequently, these transitions are detected by the first differential amplifier 58 which produces an output pulse for each positive going transition. The delay exhibited by the delay circuit 52 is selected so that the negative and positive going transitions are easily extracted from the readback signal.

As represented by the superimposed waveforms in FIG. 4b, the undelayed signal 132 is subtracted from the delayed signal 130 in the second differential amplifier 72. In this instance, the undelayed signal 132 is greater in amplitude than the delayed signal 130 and consequently the second differential amplifier 72 produces an output only when the delayed signal 130 exceeds in amplitude the undelayed signal 132. This occurs only at the negative-going transitions 136 of the delayed readback signal 130. Consequently, each negative-going transition is detected by the second differential amplifier 7. Pulse-shaping circuits (not shown) are connected to the first and second differential amplifiers 58 and 72 to produce uniform output pulses therefrom. Such uniform pulses 140 are shown in line d of FIG. 3.

The negative and positive going transitions may either be significant or extraneous. The output of the slope detector 46 is applied to the valid pulse separation and storage circuit 84 to extract the valid transition pulses from the extraneous ones and store them pending decoding and recognition of the meaning of the sequence of pulses. Consequently, all of the positive and negative transition pulses are coupled through the OR-gate 86 to fire the single-shot multivibrator 88. The first transition is always selected to be a white to black transition to provide a reference timing point. This first transition pulse $140_1$ is passed through the gate 92 into the storage register 96. The AND-gate 94 is also activated by the initial absence of an output from the multivibrator 88 and therefore produces a shift pulse for the register 97. As shown in line e of FIG. 3, the multivibrator 88 does produce a pulse 142, in response to the trailing edge of the first transition pulse $140_1$. The pulse 142 extends in duration beyond the first extraneous transition pulse 140a. Consequently, the gates 90, 92, and 94 are inhibited by transition inhibiting pulse 142 to block the first extraneous transition pulse 140a. However, the inhibit pulse 142 ends before the arrival of the next transition pulse which is a significant pulse. Consequently, the second significant transition pulse is also shifted into and stored in the first shift register 96. Thus, the extraneous transition pulses are eliminated from the readback signal and all of the significant transition pulses are shifted into and stored in the first shift register 97. The counter 98 counts these valid transition pulses that occur during the scanning of the designator 36 from the outer periphery to the center thereof. When the counter 98 counts the required number of pulses, a transfer signal is generated that jam transfers in reverse order the complements of the stored binary bits in the first shift register 96 into the second shift register 102. The first shift register 96 is also reset. The counter 98 has cycled back to its initial state in producing the transfer count.

The inner to outer half of the designator 36 is now scanned by the scanner. This portion of the scanline produces in reverse order the complements of the binary data scanned out on the first half of the scan. At the end of this portion of the scanline, the data in the first shift register 96 is compared with the data in the second shift register 102 by the comparator 104. The comparator 104 produces a transfer signal, when a match is indicated, to transfer the data from the register 102 into a decoder 108. The transfer signal from the comparator 104 inhibits the transfer gates 100 and prevents the jam transfer of the contents of the register 96 into the register 102. The decoder 108 decodes the binary bits to produce an output signal identifying the article 16. The decoder 108 also clears the registers 96 and 102. The identification signal is applied to a computer 110 wherein the article 16 is checked as to price and the price is totaled into the entire purchase. The total price is forwarded to the checkout clerk. Similarly, inventory control is achieved by counting number and types of articles that have been purchased and comparing this with the remaining quantity in the store.

An explanation of the operation of the pulse validation circuit 112 is now given. In the initial scan of the designator label 36, the scanning beam 28 traverses the concentric rings in the designator 36 at an angle that is appreciably less than perpendicular to the rings (e.g., not radially). Consequently, the readback pulses produced are elongated as compared to pulses derived from scanning across the center of the designator 36. The elongated pulses cause the pulse validation circuit 112 to generate clear pulses that reset the shift registers 96 and 102 and the counter 98 to remove any data stored as a result of these elongated pulses.

When a transition between elongated white and black level readback pulses fires the multivibrator 88, the trailing edge of the output pulse therefrom fires the multivibrator 114. Since no transition is detected before the end of the output pulse from the multivibrator 114, the AND-gate 116 is not activated and the multivibrator 118 is not fired. The trailing edge of the output from the multivibrator 114 triggers the multivibrator 120 to produce a clear pulse that is coupled through the AND-gate 122 due to the absence of an inhibit signal from the multivibrator 118.

When the scanning beam is traversing near the center of the designator 36, the transition pulses are produced close to each other such that the multivibrator 118 in the pulse validation circuit 112 is fired while the multivibrator 114 is still producing an output signal. The pulse output of the multivibrator 118 resets the multivibrator 114 and even though such a resetting causes the multivibrator 120 to generate a clear pulse, the AND-gate 122 inhibits the transmission of such a pulse to the storage registers 96 and 102 and the counter 98. The valid transitions are therefore stored in these devices.

Figure 5:
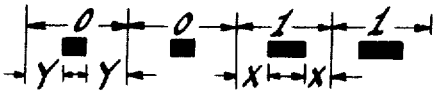
FIG. 5 is a pictorial representation of another type of coding that may be utilized on the designator labels.

In FIG. 5, there is shown another type of coding that may be utilized on a designator label 36. In this type of coding, concentric annular rings are also utilized but each information bit is contained in a black annular ring having white annular rings adjacent to it. Thus, each, information bit cell as scanned by a scanner exhibits a black portion in the center thereof and white portions on either side thereof. To designate for example a binary "0," a narrow black portion created by a narrow black annular ring is utilized whereas a wider black ring is utilized to designate a binary "1." Thus, for a bit cell of, for example, 10 milli-inches in width, a binary "0" black ring may be 3 milli-inches in width, whereas a binary "1" black ring would be 7 milli-inches in width. By width is meant the difference between the outer and inner radii of the annular rings. The sequence shown in FIG. 5 is therefore 0011. The white annular rings on either side of the black ring representing a binary "0" would therefore be 3.5 milli-inches wide, whereas the white rings adjacent the black ring representing a binary "1" would be 1.5 milli-inches wide.

Recognition of the binary numbers in such a coding system is based on detecting a white-to-black transition in the differential amplifier 72, denoting the beginning of the black annular ring. A predetermined time interval is then established and a black-to-white transition denoting the end of a black annular ring is looked for in the differential amplifier 58, within the predetermined time interval. If such a black-to-white transition does occur within the predetermined time interval, then a binary "0" is detected. If not, then a binary "1" is detected. A one shot multivibrator may be utilized to set the predetermined time interval.

Other coding schemes may also be utilized such as providing a transition in reflectance in a designator 36 only when a binary number in an information bit cell differs from a binary number in the immediately preceding information bit cell. With such a coding scheme, the successive repetitions of the same binary number, i.e., a string of "1's" or "0's" would be limited so to provide enough transitions to utilize the inherent timing contained in frequently occurring transitions.

Thus, in accordance with this invention, an article identification system is provided that permits articles to be read automatically so as to automate checkout counters in department stores, supermarkets, etc.

What is claimed is:

1. A system for classifying articles comprising, in combination:

means providing a plurality of coded designators with each one of said designators affixed to a corresponding article, said coded designators each exhibiting a plurality of information cells of first and second light-reflecting properties with the occurrence of transitions between said properties of a designator defining a binary number;

means for deriving from each of said coded designators a readback signal which includes first and second levels corresponding to said first and second properties, respectively; and means for detecting transitions between said first and second levels to provide the binary number defined by said transitions.

2. The system as claimed in claim 1 wherein said means for deriving a readback signal comprises a scanner for optically scanning said coded designators.

3. The combination in accordance with claim 2 wherein said scanner comprises a laser beam source, and means for projecting said laser beam transversely across said designators.

4. The combination in accordance with claim 3 wherein said information cells on said designators comprise a plurality of pairs of concentric annular rings with one annular ring of each pair exhibiting said first light-reflecting property and the other annular ring exhibiting said second light-reflecting property.

5. The combination in accordance with claim 4 wherein said transition detector comprises a slope detector for detecting positive and negative going slopes between said first and second levels in said readback signals.

6. A system for classifying articles comprising, in combination:

means providing a plurality of coded designators with each one of said designators affixed to a corresponding article;

said coded designators each exhibiting a plurality of information cells of first and second light-reflecting properties with the occurrence of transitions between said properties of a designator defining a binary number of a plurality of bits;

said information cells on said designators including a plurality of paired couplets of concentric annular rings with one annular ring of each couplet exhibiting said first light-reflecting property and the other annular ring exhibiting said second light-reflecting property;

an optical scanner including a laser beam source;

means for projecting said laser beam transversely across said designators, for deriving from each of said coded designators a readback signal which includes first and second levels corresponding to said first and second properties, respectively;

a slope detector for detecting transitions between said first and second levels by detecting positive and negative going slopes to provide said binary number, said transition detector detecting extraneous slopes that correspond to the boundaries of said couplets when adjacent couplets repeat the same binary bit; and a valid slope separation circuit that is coupled to suppress output signals from said slope detector that correspond to said extraneous slopes.

7. The combination comprising:

an article designator including a plurality of pairs of concentric annular rings with one ring of each pair exhibiting a first light reflectance and the other ring of each pair exhibiting a second light reflectance with a transition from said first to said second reflectance defining one binary digit and a transition from said second reflectance to said first reflectance defining the complementary binary digit;

means for scanning said article designators to provide a readback signal including transitions in amplitude corresponding to said transitions in light reflectances; and means for detecting said transitions to ascertain the binary digits represented by said transitions.

8. In a system for classifying an article, in combination:

a designator affixed to each article, said designator having a plurality of pairs of concentric rings exhibiting first and second light-reflecting properties;

means for scanning said designator to produce a readback signal exhibiting transitions to and from first and second levels of amplitude corresponding to the transitions between said first and second light-reflecting properties; and a transition detector coupled to said scanner to detect said transitions.

9. In a system in which articles are identified by binary coded designators affixed thereto, in combination:

means for scanning an article for reading from the designator the binary code recorded therein, said code comprising sequential signals representing binary digits;

a register to which said signals are applied for storing a binary code read from a designator; and means responsive to a signal due to noise read by said scanning means for resetting said register.

10. In a system as set forth in claim 9 said last named means comprising means for sensing the time interval between two successive signals.

11. In a system as set forth in claim 9, said means for scanning producing, when scanning a designator, sequential signals spaced not greater than a given time interval apart and said last named means comprising means responsive to a first signal which is not followed by a second signal within said given interval of time for resetting said register.

12. In a system as set forth in claim 9, said designators each comprising a plurality of adjacent, relatively light and relatively dark marks, and said means for scanning comprising means for scanning a beam of light over each designator and means responsive to the light reflected therefrom.

13. In a system as set forth in claim 9, the light and dark marks of each designator comprising lines, one within the other, defining at least portions of concentric circles.

*14. A system for reading a coded designator applied to a corresponding article, each coded designator having a plurality of information cells of first and second light reflecting properties representing a binary number appropriate to that article, comprising:*

*a scanner for deriving from such coded designator a readback signal which includes a single series of successive first and second levels corresponding to said first and second properties respectively; and*

*a detector responsive to a transition of either sense between said first and second levels in said readback signal to provide timing signals for use in deriving the binary number expressed by said readback signal.*

References Cited

The following references, cited by the Examiner, are of record in the patented file of this patent or the original patent.

UNITED STATES PATENTS

| | | | |
|---|---|---|---|
| 2,612,994 | 10/1952 | Woodland et al. | 340—146.3 |
| 3,247,508 | 4/1966 | Bradford et al. | 250—219 |
| 3,461,427 | 8/1969 | Parker | 340—146.3 |
| 2,975,407 | 3/1961 | O'Brien | 340—174.1 |
| 3,490,013 | 1/1970 | Lawrance et al. | 340—174.1 |
| 3,334,298 | 8/1967 | Monrod-Krohm | 328—114 |
| 3,359,405 | 12/1967 | Sundblad | 235—61.11 |

THOMAS A. ROBINSON, Primary Examiner

U.S. Cl. X.R.

328—114; 340—146.1 A, 146.3 AG